United States Patent
Igarashi et al.

(10) Patent No.: US 10,819,600 B2
(45) Date of Patent: Oct. 27, 2020

(54) DATA COLLECTION APPARATUS AND DATA COLLECTION METHOD

(71) Applicant: HITACHI, LTD., Tokyo (JP)

(72) Inventors: Yuichi Igarashi, Tokyo (JP); Ryo Nakano, Tokyo (JP); Jumpei Honda, Tokyo (JP); Hiroshige Kashiwabara, Tokyo (JP); Takuma Nishimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 39 days.

(21) Appl. No.: 16/164,962

(22) Filed: Oct. 19, 2018

(65) Prior Publication Data

US 2019/0123986 A1    Apr. 25, 2019

(30) Foreign Application Priority Data

Oct. 24, 2017    (JP) .................... 2017-205635

(51) Int. Cl.
*H04L 12/26*    (2006.01)
*H04L 29/08*    (2006.01)
(Continued)

(52) U.S. Cl.
CPC .......... *H04L 43/08* (2013.01); *G05B 19/4183* (2013.01); *G05B 19/4185* (2013.01);
(Continued)

(58) Field of Classification Search
CPC .... H04W 84/18; H04L 67/125; H04L 67/325; H04L 43/024; H04L 43/08; G05B 19/4183; G05B 19/4185
See application file for complete search history.

(56) References Cited

U.S. PATENT DOCUMENTS 7,142,512 B1 * 11/2006 Kobayashi .......... H04L 41/5019
                                                         370/232
7,653,725 B2 *  1/2010 Yahiro ................ G06F 11/3485
                                                         709/223
(Continued)

FOREIGN PATENT DOCUMENTS

EP        2597911 A1    5/2013
JP    2015-032086 A     2/2015
(Continued)

OTHER PUBLICATIONS

Extended European Search Report, dated Mar. 14, 2019, which issued during the prosecution of European Patent Application No. 18201918.2, which corresponds to the present application.

*Primary Examiner* — Thomas J Dailey
(74) *Attorney, Agent, or Firm* — Baker Botts L.L.P.

(57) ABSTRACT

A data collection apparatus collecting data from a terminal device connected through a communication path, comprising a schedule managing unit determining a schedule transmitting a data acquisition request to the terminal device according to managed timing data, a transmission amount adjusting unit adjusting a transmission amount of the data acquisition request, and a collected data managing unit managing the data collected from the terminal device, in which the schedule managing unit manages a start point time that is a time at which a data collection from each terminal device starts, a collection period that is an interval of the data collection from each terminal device, a retransmission interval that is a time until the data acquisition request is retransmitted when the data collection from the terminal device fails, and a retransmission number that is the number of times to retransmit the data acquisition request as the timing data.

13 Claims, 10 Drawing Sheets

(51) Int. Cl.
  *G05B 19/418* (2006.01)
  *H04W 84/18* (2009.01)
(52) U.S. Cl.
  CPC .......... *H04L 43/024* (2013.01); *H04L 67/125* (2013.01); *H04L 67/325* (2013.01); *H04W 84/18* (2013.01)

(56) References Cited

U.S. PATENT DOCUMENTS

| | | | |
|---|---|---|---|
| 2005/0122231 A1* | 6/2005 | Varaiya | H04W 40/22 340/870.01 |
| 2009/0213822 A1* | 8/2009 | Keshavarzian | H04L 47/10 370/338 |
| 2013/0154850 A1* | 6/2013 | Chan | G01D 4/002 340/870.02 |
| 2015/0172031 A1 | 6/2015 | Yeo et al. | |
| 2016/0337167 A1 | 11/2016 | Kawato | |
| 2018/0139270 A1 | 5/2018 | Inoue et al. | |
| 2018/0213348 A1* | 7/2018 | Natarajan | H04W 4/70 |

FOREIGN PATENT DOCUMENTS

| | | |
|---|---|---|
| JP | 2016-152611 A | 8/2016 |
| WO | WO 2016/189926 A1 | 12/2016 |

\* cited by examiner

FIG. 5

| DEVICE ID | START POINT TIME (HH:MM) | PERIOD (HH:MM) | RETRANSMISSION INTERVAL (HH:MM) | RETRANSMISSION NUMBER | RELATED Gr | NEXT TRANSMISSION (HH:MM:SS) |
|---|---|---|---|---|---|---|
| AA-BB-11 | 08:00 | 24:00 | 00:05 | 3 | 1 | 08:00:06 |
| AA-BB-11 | 17:00 | 24:00 | 00:05 | 3 | 2 | 17:00:20 |
| AA-BB-22 | 08:00 | 01:00 | 00:10 | 1 | 1 | 08:00:08 |
| AA-BB-33 | 17:00 | 06:00 | 00:10 | 1 | 2 | 17:00:22 |
| AA-BB-44 | 09:00 | 00:30 | 00:05 | 2 | — | 09:00:00 |
| AA-BB-55 | 08:00 | 00:15 | 00:05 | 2 | — | 08:00:30 |

FIG. 6

| DEVICE ID | SENSOR TYPE | DATA LENGTH |
|---|---|---|
| AA-BB-11 | THERMOMETER | 30B |
| AA-BB-22 | HYGROMETER | 30B |
| AA-BB-33 | CAMERA | 2KB |
| AA-BB-44 | PRESSURE GAUGE | 30B |
| AA-BB-55 | AMPERE METER | 80B |

FIG. 7

| DEVICE ID | COMMUNICATION QUALITY | | NUMBER OF HOPS |
| | COMMUNICATION SUCCESS PROBABILITY | COMMUNICATION DELAY | |
|---|---|---|---|
| AA-BB-11 | 75% | 1.1 SECONDS | 2 |
| AA-BB-22 | 90% | 0.7 SECONDS | 1 |
| AA-BB-33 | 95% | 0.5 SECONDS | 1 |
| AA-BB-44 | 80% | 1.2 SECONDS | 2 |
| AA-BB-55 | 64% | 1.8 SECONDS | 3 |

DATA COLLECTION APPARATUS AND DATA COLLECTION METHOD

CLAIM OF PRIORITY

The present application claims priority from Japanese patent application JP 2017-205635 filed on Oct. 24, 2017, the content of which is hereby incorporated by reference into this application.

BACKGROUND OF THE INVENTION

1. Field of the Invention

The present invention relates to a data collection apparatus.

2. Description of the Related Art

Recently, systems that collect data from factory facilities or equipment and remotely monitor or control the facilities or equipment based on the collected data are provided. In such systems, the data from factory facilities or equipment is acquired regularly and on demand by using wireless communication.

As background art of the present technical field, there are the following related arts. JP 2015-32086 A discloses a terminal having an application execution function of a smartphone or the like, and comprising a log collecting means for collecting an operation log or a sensor log, a situation estimating means for estimating a peripheral situation or a usage situation of a user by analyzing the collected log, and a situation outputting means for outputting an estimated result to an arbitrary application as a plurality kinds of situation data which is a symbol common to all users, wherein the log collecting means rejects access from any other than the situation estimating means.

In addition, JP 2016-152611 A discloses a data collection apparatus comprising a schedule information generating unit generating schedule information based on a history of a request frame output by a data collecting unit, a schedule information transmitting unit transmitting the schedule information to a relay device from a communication unit, a correspondence information generating unit generating correspondence information indicating a correspondence of the request frame and a response frame, and a frame processing unit specifying the response frame corresponding to the request frame output by the data collecting unit based on the correspondence information after transmitting the schedule information to the relay device, and supplying the specified response frame to the data collecting unit.

SUMMARY OF THE INVENTION

However, in a system that acquires data from factory facilities or equipment, in addition to regularly collecting data, the data may be irregularly collected on demand, but in the above-described conventional technique, the on-demand data collection is not taken into consideration, and an increase in communication load due to the on-demand data collection is a problem.

In addition, when the data is collected from the data collection terminal using a polling method, large data may be collected by one data acquisition request, and a communication load considering a size of a response packet is not leveled.

In order to maintain stable communication in a wireless network, in particular, a wireless multihop network, it is important to avoid an excessive communication load and to maintain a constant load. Therefore, in order to collect the data with high efficiency and high probability in the wireless multihop network, it is necessary to level the communication load in consideration of occurrences of on-demand communication, regular communication, and large capacity communication.

An aspect of the present invention provides a data collection apparatus collecting data with high efficiency and high probability by adjusting a communication schedule in consideration of occurrences of regular communication, on-demand communication, large capacity communication, and the like and stably operating a wireless multihop network.

A representative example of the invention disclosed in the present application is as follows. That is, a data collection apparatus collecting data from a terminal device connected through a communication path, the data collection apparatus includes a schedule managing unit determining a schedule transmitting a data acquisition request to the terminal device according to managed timing data, a transmission amount adjusting unit adjusting a transmission amount of the data acquisition request, and a collected data managing unit managing the data collected from the terminal device, in which the schedule managing unit manages a start point time that is a time at which a data collection from each terminal device starts, a collection period that is an interval of the data collection from each terminal device, a retransmission interval that is a time until the data acquisition request is retransmitted when the data collection from the terminal device fails, and a retransmission number that is the number of times to retransmit the data acquisition request as the timing data.

According to an aspect of the present invention, the communication load can be leveled by considering the data collection including a plurality of requirements. The problems, constructions and effects other than those mentioned above will be clarified by the description of the following embodiments.

BRIEF DESCRIPTION OF THE DRAWINGS

FIG. 5 is a diagram illustrating a configuration example of a schedule information managing table;

FIG. 6 is a diagram illustrating a configuration example of a device information managing table;

FIG. 7 is a diagram illustrating a configuration example of a wireless information managing table;

DESCRIPTION OF THE PREFERRED EMBODIMENTS

Hereinafter, embodiments of the present invention will be described in detail with reference to the accompanying drawings.

First Embodiment

Figure 1:
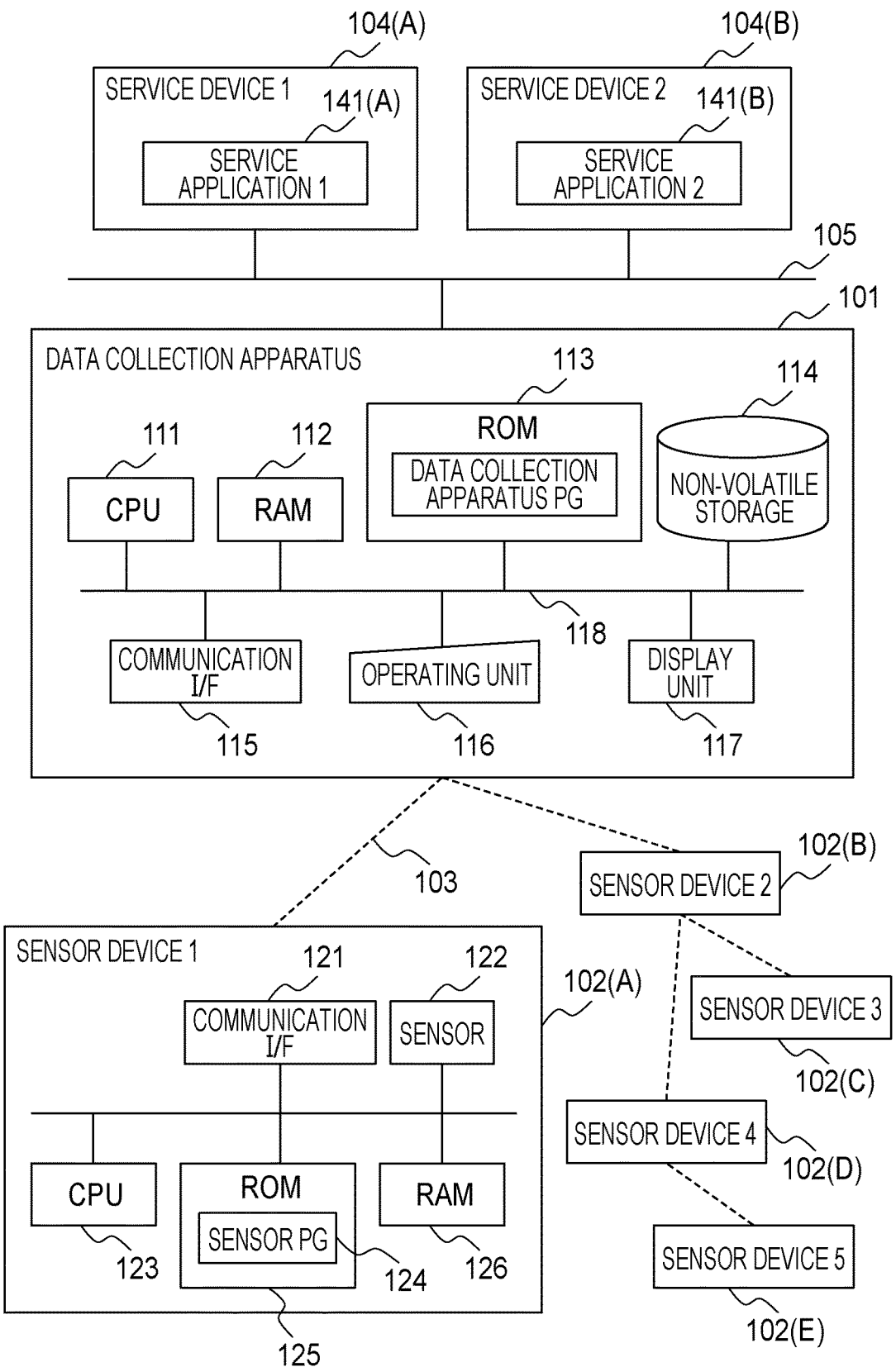
FIG. 1 is a diagram illustrating a configuration of a data collection system according to a first embodiment.

FIG. 1 is a diagram illustrating a configuration of a data collection system according to a first embodiment.

A data collection system according to the present embodiment has a data collection apparatus 101, a plurality of service devices 2 (104 (A), 104 (B), . . . ), and a plurality of sensor devices 102 (102 (A), 102 (B), . . . ). The plurality of service devices 2 (104 (A), 104 (B), . . . ) are connected to the data collection apparatus 101 through a communication path 105 such as a network, and the data collection apparatus 101 is connected to the plurality of sensor devices 102 (102 (A), 102 (B), . . . ) through a communication path 103 of a wireless network (a wireless multihop network). The service devices 2 are server devices in which an application program (hereinafter, referred to as a service application) 141 providing a service using site data collected from each of the sensor devices 102 to a user is mounted, and is prepared for each of the services. The service devices 2 acquire necessary measurement data (environment information, facility information, and the like) from the sensor devices 102 through the data collection apparatus 101.

The sensor devices 102 are terminal devices that acquire the measurement data from measurement targets (apparatus or environments to be monitored) and transmit the acquired site data to the data collection apparatus 101, and are provided for each of the measurement targets. The sensor devices 102 have various configurations depending on the type of site data to be acquired. For example, the sensor devices 102 are a temperature measurement device that measures a temperature sensor of a measurement target, a camera device that acquires an image of a device to be monitored, an acoustic sensor device that collects sounds (noise) of an environment to be monitored, and the like. Various settings such as a sensing method and a sensing timing corresponding to each sensor are managed by RAM 126 and ROM 125 in the sensor devices 102. A CPU 123 executes a sensor program 124 stored in the ROM 125. The measurement data acquired by the sensor 122 of the sensor device 102 is transmitted from a communication interface 121 to the wireless communication path 103, and is collected in the data collection apparatus 101. The CPU 123 of the sensor device 102 is a processor that controls the overall operation of the sensor device 102. The RAM 126 is used as a work memory of the CPU 123, and the ROM 125 is mainly used to store programs. Further, a part of a processing performed by the CPU 123 executing the program may be performed by hardware (for example, FPGA).

The data collection apparatus 101 is a calculator having a CPU 111, a RAM 112, a ROM 113, a non-volatile storage 114, a communication interface 115, an operating unit 116, and a display unit 117. The CPU 111 is an arithmetic device that executes various processes at the time of transmitting a data acquisition request or receiving data at the data collection apparatus 101. Further, a part of a function executed by the CPU 111 may be executed in the arithmetic device (for example, FPGA) by hardware. The RAM 112 is a high-speed and volatile storage element such as dynamic random access memory (DRAM), and temporarily stores a program to be executed by the CPU 111 and data to be used at the time of executing the program. The ROM 113 is a non-volatile storage element and stores an invariable program (for example, BIOS) or the like.

The non-volatile storage 114 includes a non-volatile storage medium such as a hard disk device, a non-volatile semiconductor storage device (solid state drive), a non-volatile memory, and the like, and is used for holding applications, data, and the like for a long period of time. The non-volatile storage 114 stores various programs for functioning the data collection apparatus 101, in addition to an operating system (OS) or various parameters. That is, the program is read out from the non-volatile storage 114, is loaded on the RAM 112, and is executed by the CPU 111.

The communication interface 115 is a device that performs a protocol control at the time of performing communication through the communication path 105 or the communication path 103, and is, for example, a network interface card (NIC). The operating unit 116 includes, for example, a keyboard, a mouse, or the like, and is used by the user to input various operations or commands. The display unit 117 includes, for example, a liquid crystal display, and displays a necessary screen or results of various processes. A device information managing table 204, a schedule information managing table 205, and a wireless information managing table 213 to be described below are stored and held in the RAM 112 or the non-volatile storage 114.

The program executed by the CPU 111 is provided to the data collection apparatus 101 through a removable media (CD-ROM, a flash memory, and the like) or a network and is stored in the non-volatile storage 114, which is a non-temporary storage medium. For this reason, the data collection apparatus 101 may have an interface that reads data from the removable media.

The data collection apparatus 101 is a calculator system configured physically on one calculator, or a plurality of calculators configured logically or physically, and may operate on a separate thread on the same calculator and may operate on a virtual calculator built on a plurality of physical calculator resources.

Figure 2:
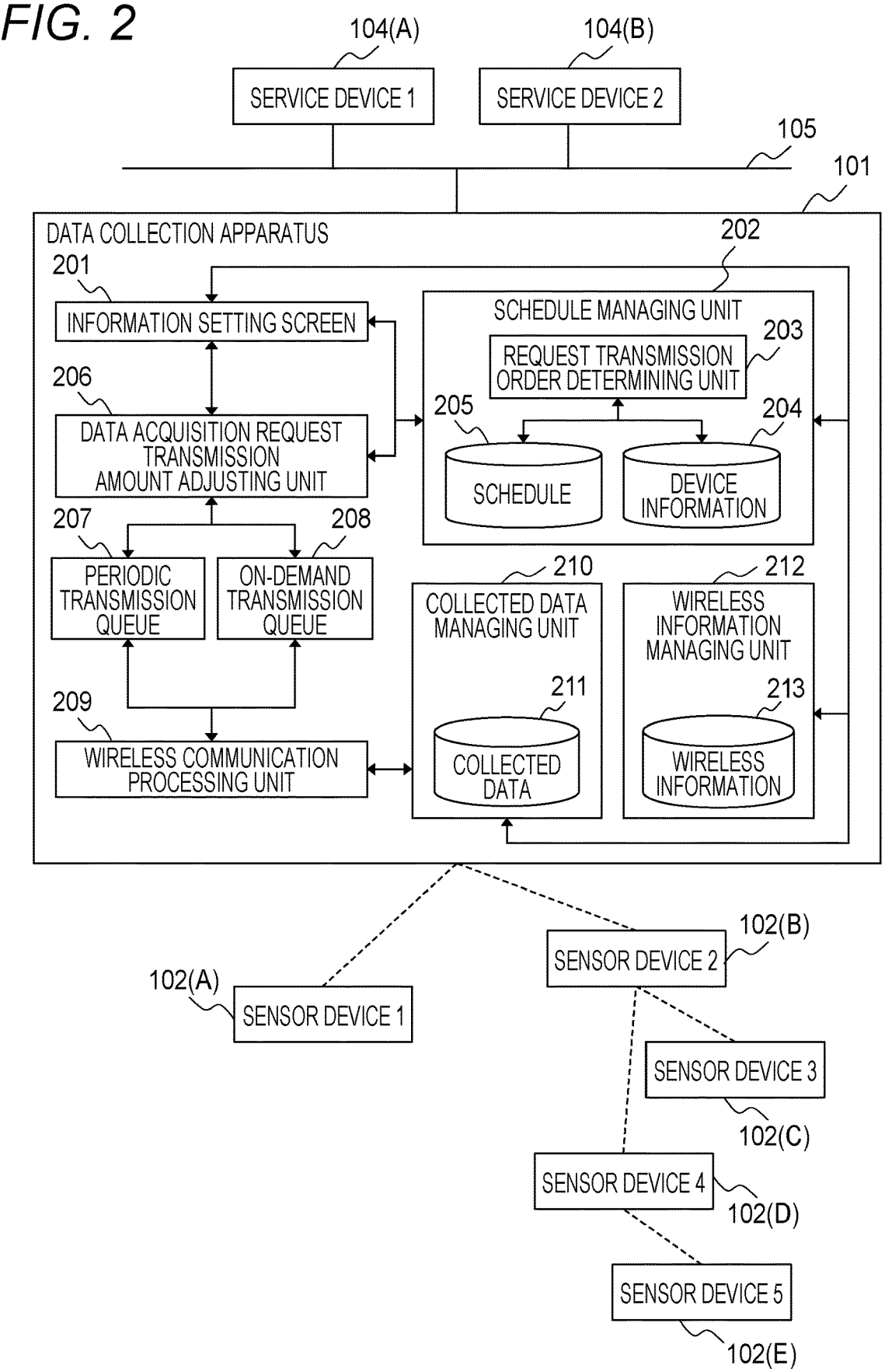
FIG. 2 is a diagram illustrating a functional configuration of a data collection apparatus.

FIG. 2 is a diagram illustrating a functional configuration of the data collection apparatus 101.

In the data collection system according to the present embodiment, a system manager registers schedule information such as the time (start point time) at which a data collection starts, a collection interval, the interval or the number of times of reacquisition request at the time of collection failure, and the like in a schedule 205 of the schedule managing unit 202 in advance for site data collected from each of the sensor devices 102. In addition, the system manager registers information such as the type of the sensors 122 of the various sensor devices 102 in device information 204 in advance.

In addition, the wireless information managing unit 212 collects quality information of a wireless multihop network between the data collection apparatus 101 and the sensor devices 102 in real time, and stores and holds the collected quality information in the wireless information 213. For example, the wireless information managing unit 212 collects the number of hops, which is a position in the network of each of the sensor devices 102, a communication success probability, or the like.

The data collection apparatus 101 determines a data acquisition order for making a communication band uniform for a long period of time in a request transmission order determining unit 203 of the schedule managing unit 202 by using the schedule 205, the device information 204, and the wireless information 213 which are registered in advance as described above, and registers the determined data acquisition order in the schedule 205 as an execution schedule. The data collection apparatus 101 executes a regular and periodic data acquisition according to the execution schedule. At the time of regularly and periodically acquiring the data, the data acquisition request transmission amount adjusting unit 206 stores the data acquisition request in a periodic transmission queue 207 while adjusting a data acquisition request interval with reference to the wireless information 213 and the device information 204, and transmits the data acquisition request to the sensor devices 102 through the wireless communication processing unit 209.

Upon receiving the data acquisition request, each sensor device 102 returns a response packet that stores the measurement data measured by the sensor 122. The wireless communication processing unit 209 of the data collection apparatus 101 receives the response packet and transmits the received response packet to the collected data managing unit 210.

The collected data managing unit 210 analyzes a payload portion of a wireless packet collected from each sensor device 102, retrieves the measurement data, and stores the retrieved measurement data in collected data 211.

In addition, the service device 104(A) or the service device 104(B) can generate a request to acquire data irregularly from the sensor devices 102(A) . . . 102(E) on demand through an information setting screen 201. For example, in addition to a periodic schedule, an on-demand data generation request is used, for example, when it is desired to acquire current data. In this case, an on-demand data acquisition request is transmitted to the data acquisition request transmission amount adjusting unit 206 from the information setting screen 201, the data acquisition request transmission amount adjusting unit 206 adjusts a data acquisition request interval with reference to the wireless information 213 and the device information 204 while storing the on-demand data acquisition request in the on-demand transmission queue 208, and transmits the on-demand data acquisition request to the sensor device 102 via the wireless communication processing unit 209. The on-demand transmission queue 208 transmits the data acquisition request to the wireless communication processing unit 209 in preference to the periodic transmission queue 207.

Figure 3:
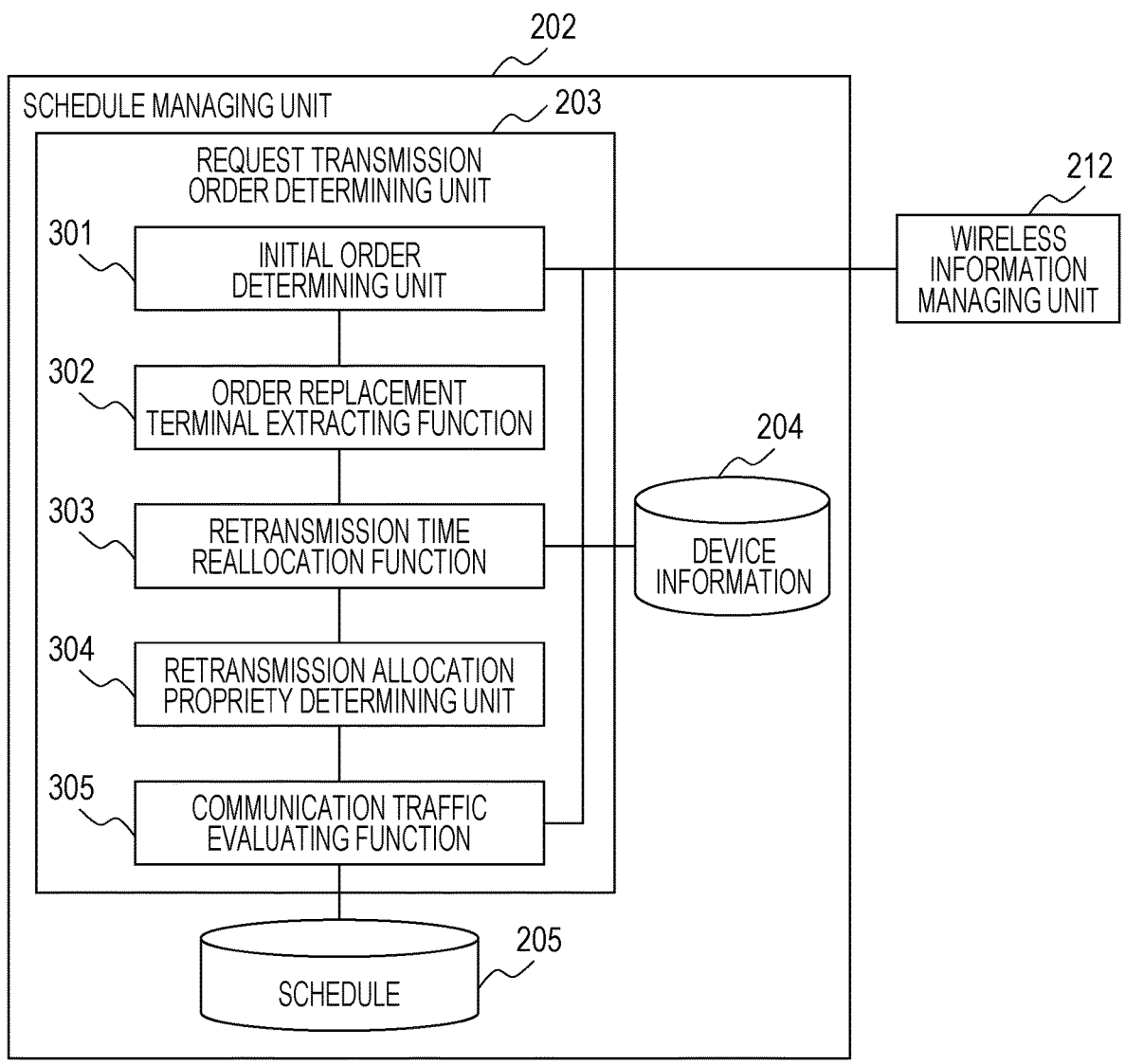
FIG. 3 is a diagram illustrating a configuration of a request transmission order determining unit.

FIG. 3 is a diagram illustrating a configuration of the request transmission order determining unit 203 of the schedule managing unit 202 in the data collection apparatus 101.

The request transmission order determining unit 203 determines the data acquisition request order for all the sensor devices 102 registered in the device information 204 by taking into consideration information necessary for schedule determination of the periodic transmission input by the system manager in advance (start point time at which the periodic transmission starts, a collection interval, a retransmission interval, the retransmission number of times, etc.). In this case, when the start point time at the same time is set, a provisional order is determined in the order of subscribing the wireless network, or by selecting the order randomly.

Next, an order replacement terminal extracting function 302 selects a plurality of sensor devices 102 for which the order can be replaced from the initial order and replaces the data acquisition order. At this time, in conjunction with a retransmission time reallocation function 303, the orders of a first data acquisition request and a data acquisition request of retransmission in the case in which the request fails are replaced.

For example, the schedule of the sensor device (A) having the start point time 0:00 and the collection interval of 15 minutes and the schedule of the sensor device (B) having the start point time 0:00 and the collection interval of 10 minutes are input and set in advance, and when the first data acquisition request at 0:00:30 and the data acquisition request for retransmission at 0:05:30 for the sensor device (A), and the first data acquisition request at 0:02:45 and the data acquisition request for retransmission at 0:06 for the sensor device (B) are set as the initial orders, the order replacement terminal extracting function 302 selects the sensor device (A) and the sensor device (B), and replaces times of the first data acquisition request of the sensor device (A) and the data acquisition request for retransmission of the sensor device (B) in conjunction with the retransmission time reallocation function 303. As a result, the first data acquisition request of the sensor device (B) at 0:02:45 and the first data acquisition request of the sensor device (A) at 0:06:30 are reallocated, and the retransmission time is then set again in consideration of each collection interval. For example, the data acquisition request for retransmission of the sensor device (B) is again allocated at 0:05:30 and the data acquisition request for retransmission of the sensor device (A) is again allocated at 0:10:10.

If this retransmission allocation cannot be made, the order replacement is impossible and it is necessary to return to the schedule before the replacement. A retransmission allocation propriety determining unit 304 performs such a determination. With respect to such an order replacement, a communication traffic evaluating function 305 confirms and evaluates that the generation of communication traffic is made uniform in a long-term schedule.

Figure 4:
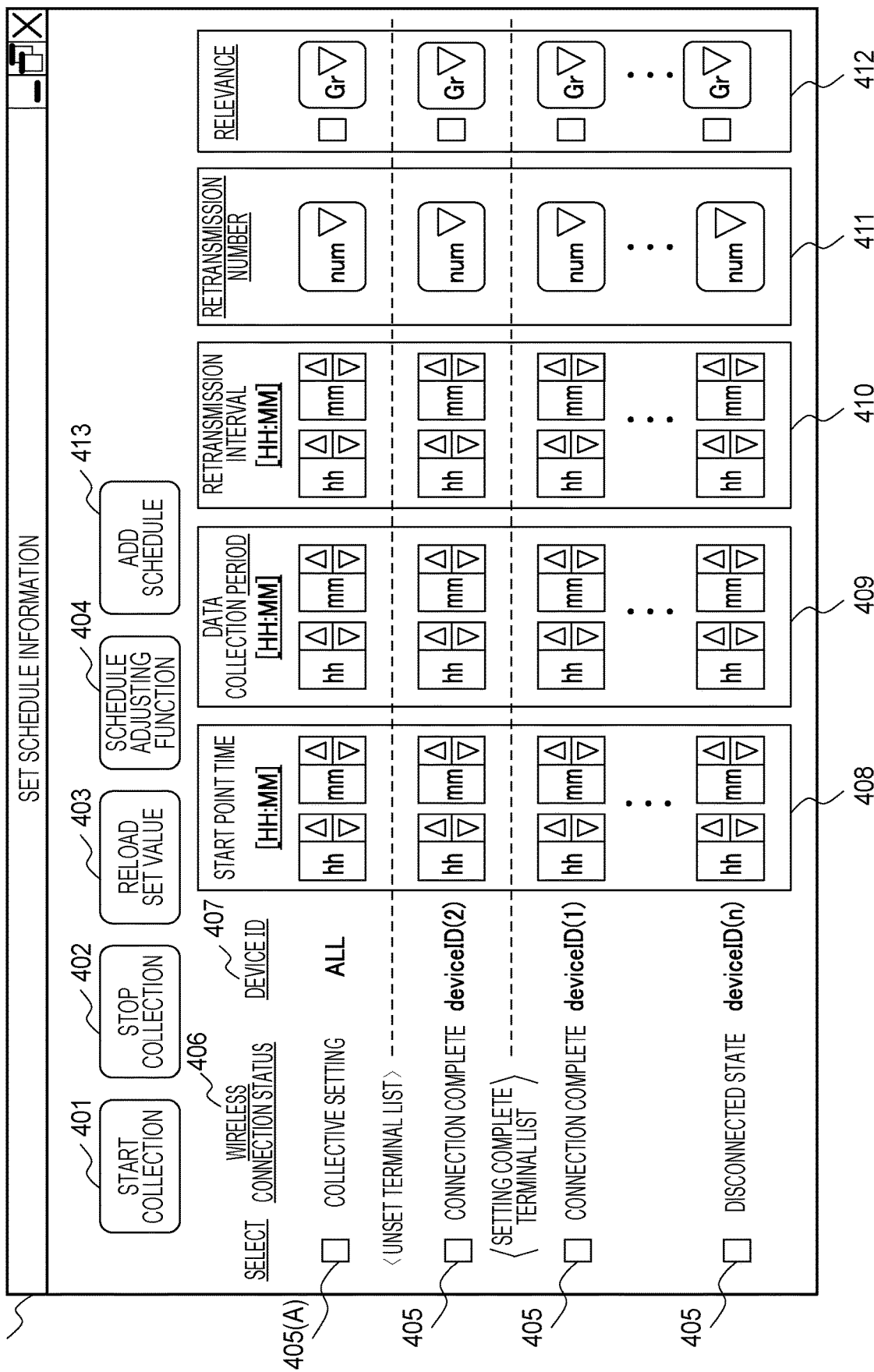
FIG. 4 is a diagram illustrating a configuration of a schedule information setting screen.

FIG. 4 is a diagram illustrating a configuration of the schedule information setting screen 201.

The information setting screen (schedule information registration and cancellation screen) 201 displays the contents registered in the schedule 205 and includes an input column for registering the schedule 205. Specifically, the information setting screen 201 includes a collection start button 401, a collection stop button 402, a set value reload button 403, a schedule adjustment function button 404, a selection box 405 of the setting device, a wireless connection status display unit 406, a device ID display unit 407, a start point time input and display unit 408, a data collection period input and display unit 409, a retransmission interval input and display unit 410, a retransmission number input and display unit 411, and a relevance input and display unit 412.

The collection start button 401 is a button for instructing the data collection apparatus 101 to start the periodic collection according to the schedule. The collection stop button 402 is a button for instructing the data collection apparatus 101 to stop the periodic collection. The set value reload button 403 is a button for updating the display contents of the start point time input and display unit 408, the data collection period input and display unit 409, the retransmission interval input and display unit 410, the retransmission number input and display unit 411, and the relevance input and display unit 412 by reading the schedule 205 of period collection of each sensor device which has already been set up. The schedule adjustment function button 404 is a button for instructing the request transmission order determining unit 203 to execute the order replacement for the purpose of making the communication traffic or the like uniform, with respect to the initial order of the data acquisition request transmission order of the sensor device 102. The schedule adjustment function button 404 is switched between validity and invalidity of the transmission order adjusting function for each operation.

The selection box 405 of the setting device is a check box for selecting the sensor device 102 to be targeted when the schedule information of the period collection of each sensor device 102 input in advance is changed or when the schedule information is input to the sensor device 102 that has not input the schedule. When the same start point time, data collection period, retransmission interval, and retransmission number are set for all the sensor devices 102 without setting the schedule for the individual sensor device 102, a selection box 405(A) for collective setting may be selected.

In addition, a plurality of start point times and data collection periods may be set for the same sensor device. When the system manager selects the sensor device 102 for setting an additional schedule by using the selection box 405 and operates a schedule adding button 413, a column for inputting a schedule is added, and an additional schedule of the sensor device 102 whose data collection schedule has already been set can be input. In the present embodiment, since it is possible to set schedule of a plurality of start point times and periods for one sensor device 102, the data collection schedule can be flexibly set. For example, the data can be collected at irregular intervals. In addition, one sensor device 102 can be shared by a plurality of uses (service application 141), and an increase in the number of installed sensor devices 102 can be suppressed.

The wireless connection status display unit 406 is an area for displaying the connection status of the wireless network of each sensor device 102, such as, for example, the sensor device has already subscribed the current wireless network and is in a connected state, has not subscribed because it is waiting for subscription, or is in a disconnected status due to worsening of the wireless condition after subscription.

The device ID display unit 407 is an area for displaying identification information (device ID) for identifying the sensor device 102 that executes registration and cancellation of schedule information. The device ID may be uniquely determined without duplication within the system, or may be globally uniquely determined. For example, a MAC address allocated for wireless communication may be used.

The start point time input and display unit 408 is an area for inputting and displaying the time at which periodical data collection should be started to the sensor device 102, and in the example, hours and minutes can be set. The data collection period input and display unit 409 is an area for inputting and displaying the time interval at which a period collection is executed. For example, when the service application 141 wishes to have a certain sensor device 102 monitor the temperature at 8 o'clock every morning, 8:00 may be set at the start point time and 24:00 may be set at the data collection period. In addition, in the present system, it is assumed that the wireless network is used, so the data collection does not necessarily succeed. Therefore, in consideration of failure of the data collection, the retransmission interval can be input and displayed in the retransmission interval input and display unit 410 and the retransmission number can be input and displayed in the retransmission number input and display unit 411. The retransmission number and the retransmission interval are set by the service application 141 or the system manager according to the response time and degree of necessity for the data acquisition request of the service application 141.

The relevance input and display unit 412 is an area for setting a group of the sensor devices 102 when it is desired to continuously collect the data from a plurality of sensor devices 102. For example, in a certain service application 141, both information from the sensor device 102(A) and information from the sensor device 102(B) are used. For example, it is represented in a graph in which a value of the sensor device 102(A) is set on an X axis and a value of the sensor device 102(B) is set on a Y axis.

FIG. 5 is a diagram illustrating a configuration example of the schedule information managing table 205.

As described above, in the data collection apparatus 101, when the system manager, the service application 141, or a system connected to the outside of the data collection system (a system management program operating in the external system) inputs and sets the schedule information, the schedule managing unit 202 registers the information in the schedule 205. The schedule information managing table 205 is a table for managing a data collection schedule from the data collection apparatus 101 to each sensor device 102, and includes a device ID column 501, a start point time column 502, a collection period column 503, a retransmission interval column 504, a retransmission number column 505, a related Gr column 506, and a next transmission column 507.

The device ID column 501 stores identification information of the sensor device 102 of which data collection schedule is managed. The data stored in the device ID column 501 is displayed on the device ID display unit 407 of the information setting screen 201.

The start point time column 502 stores information input to the start point time input and display unit 408 of the information setting screen 201. The collection period column 503 stores information input to the data collection period input and display unit 409 of the information setting screen 201. The retransmission interval column 504 stores information input to the retransmission interval input and display unit 410 of the information setting screen 201. The retransmission number column 505 stores information input to the retransmission number input and display unit 411 of the information setting screen 201. The related Gr column 506 stores information input to the relevance input and display unit 412 of the information setting screen 201.

The next transmission column 507 stores a next data acquisition request time according to the order determined by the schedule adjustment. The next transmission time stores the time at which the data acquisition request should be executed without distinguishing between the first data acquisition request and the retransmission data acquisition request. Therefore, when the first data acquisition is performed, a scheduled retransmission time is stored in the next transmission column 507 and when the data acquisition from the sensor device 102 is successful, the scheduled retransmission time is updated at the next first data acquisition request time calculated from the data collection period.

For example, in a row 510 of the schedule information managing table 205, with respect to the sensor device 102 having the device ID 'AA-BB-11', a schedule in which the start point time is 8:00, the period is 24 hours, the retransmission interval is 5 minutes, the retransmission number is 3, the related Gr is 1, and the next transmission is performed at 8:00:06 is registered. In addition, as described above, in the present invention, it is possible to set a plurality of periods for the same sensor device, and in a row 511, with respect to the sensor device 102 having the same device ID 'AA-BB-11' as the row 510, a schedule in which the start point time is 17:00, the period is 24 hours, the retransmission interval is 5 minutes, the retransmission number is 3, the related Gr is 2, and the next transmission is performed at 17:00:20 is registered. In addition, in a row 512, with respect to the sensor device 102 having a device ID 'AA-BB-22', a schedule in which the start point time is 8:00, the period is 1 hour, the retransmission interval is 10 minutes, the retransmission number is 1, the related Gr is 1, and the next transmission is performed at 8:00:08 is registered. In this case, the row 510 and the row 512 are registered as the same related Gr and are continuously scheduled with respect to data collected at 8 o'clock. On the other hand, since the schedule of the row 512 is a one-hour period and the schedule of the row 510 is a 24-hour period, the schedules become the data acquisition request schedules in which the related Gr is not taken into consideration at the time (9 o'clock, 10 o'clock, etc.) at which the data acquisition request times of both schedules do not coincide.

FIG. 6 is a diagram illustrating a configuration example of a device information managing table 204.

The device information managing table 204 is a table for managing information unique to the sensor device 102 such as the type of the sensor device 102 or the like, and includes a device ID column 601, a sensor type column 602, and data length column 603. The device information managing table 204 is registered by a system manager, a system management program, a service application 141, or the like.

For example, in a row 610, it is shown that the sensor device 102 of a device ID 'AA-BB-11' is a thermometer and data of a data length of 30B including measurement data is transmitted from the sensor device 102 to the data collection apparatus 101.

FIG. 7 is a diagram illustrating a configuration example of the wireless information managing table 213.

The wireless information managing table 213 is a table for managing information such as the configuration of the wireless network and communication quality collected by the data collection apparatus 101 via the wireless communication processing unit 209 by the wireless information managing unit 212. The wireless information managing table 213 includes a device ID column 701, a communication quality column 702, and a hop number column 703. In the illustrated example, the communication quality column 702 includes a communication success probability 702(A) and a communication delay 702(B), but may be a part thereof or may include other information. For example, when the received radio wave intensity, the number of neighboring sensor devices 102, etc. can be acquired from the wireless network, this information may be managed together.

For example, in a row 710, it is shown that the sensor device 102 of a device ID 'AA-BB-11' has subscribed to the network from the data collection apparatus 101 via an one-stage relay device at the place located two hops ahead, an actual value of the communication delay is 1.1 seconds on average, and the probability that the data collection apparatus 101 can acquire data at one time by transmitting the data acquisition request is 75%.

Next, a schedule adjustment processing 801 executed by the schedule managing unit 202 and a transmission amount adjustment processing 901 executed by the data acquisition request transmission amount adjusting unit 206 will be described with reference to FIGS. 8 and 9, in the first embodiment.

Figure 8:
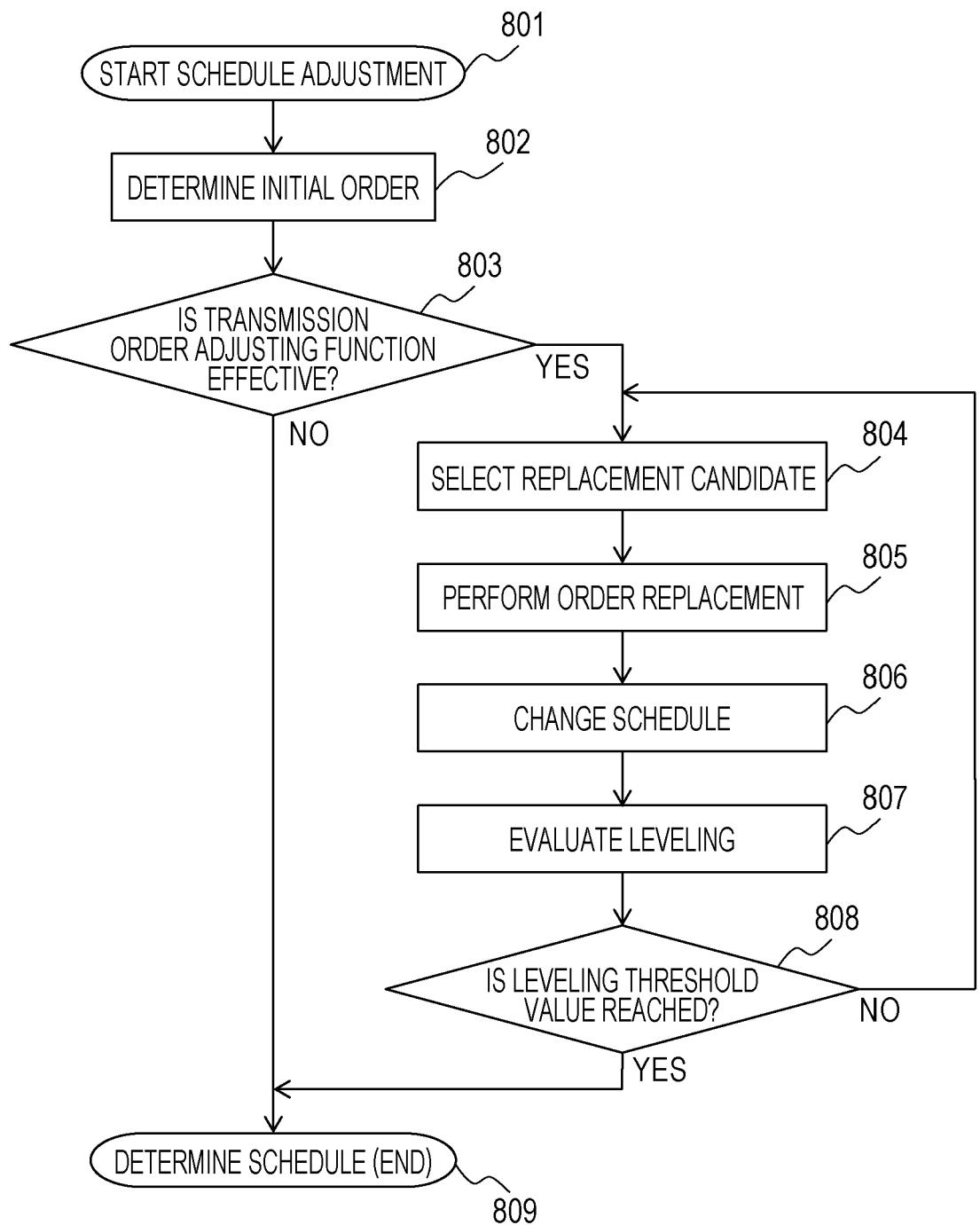
FIG. 8 is a flowchart of a schedule adjustment process according to a first embodiment.
Figure 9:
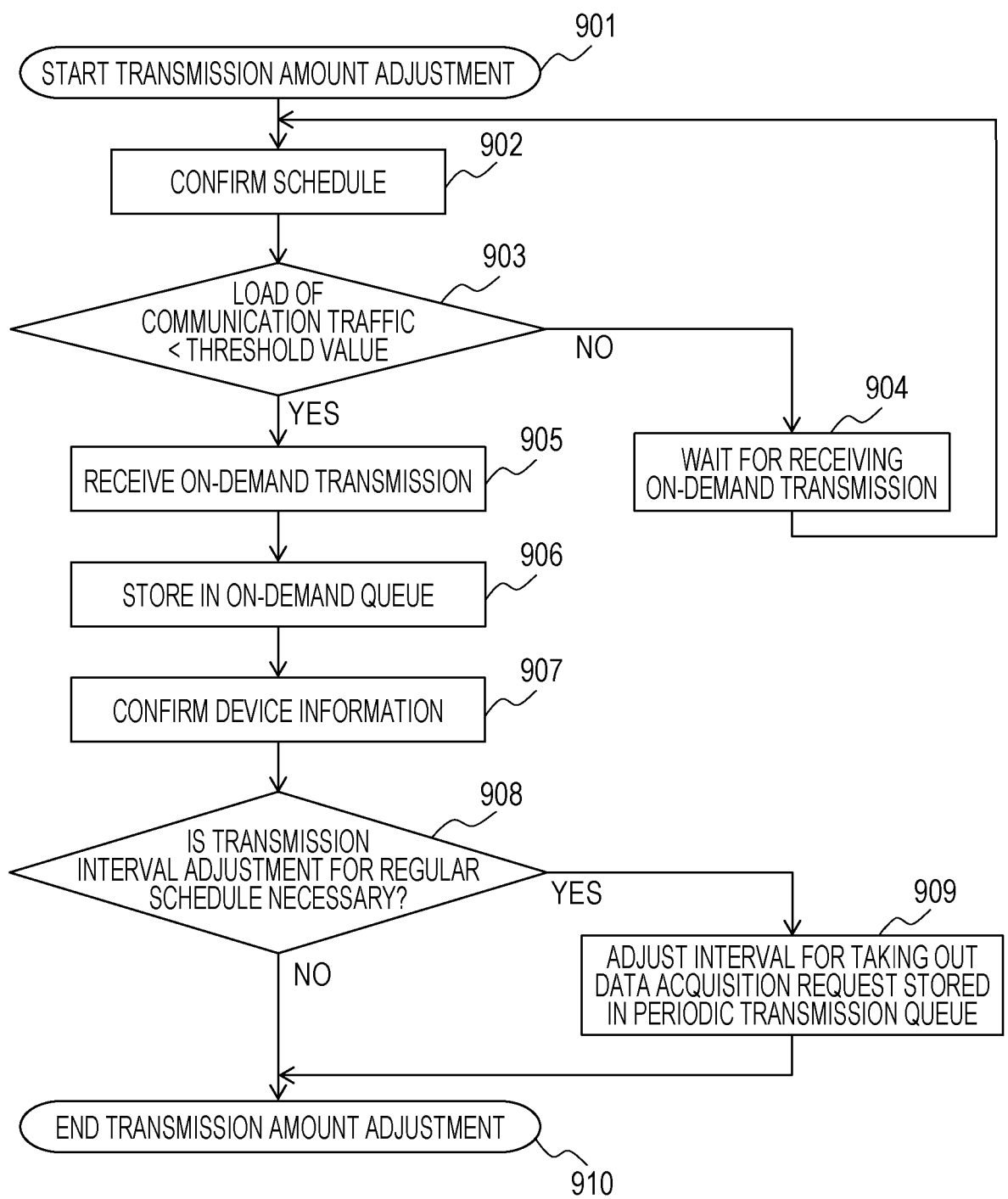
FIG. 9 is a flowchart of a transmission amount adjustment.

In the data collection apparatus 101, when the schedule for data acquisition request is input to the information setting screen 201 and the collection start button 401 is operated, the request transmission order determining unit 203 of the schedule managing unit 202 executes the schedule adjustment processing 801 illustrated in FIG. 8 for the data acquisition request transmitted to each sensor device 102 and determines the schedule of the data acquisition request.

First, in step 802, the request transmission order determining unit 203 (initial order determining unit 301) reads out all the data stored in the schedule information managing table 205, and determines the order of the sensor devices 102 as transmission destinations of the data acquisition request, based on the start point time, the collection interval, the retransmission number, and the retransmission interval. The initial order determined in step 802 can employ any order such as the order in which the wireless network is subscribed or a randomly arranged order, and the communication traffic may not necessarily be made uniform or leveled in the entire schedule. At this time, if the sensor devices 102 are arranged at time intervals considering the delay time of the response packet for the data acquisition request, collision between the data acquisition request and the response packet or collision between the response packets can be avoided.

Next, in step 803, it is determined whether the transmission order adjusting function is valid or invalid. Specifically, it is possible to determine whether the transmission order adjusting function is switched to be valid by the operation of the schedule adjustment function button 404 of the information setting screen 201. If the transmission order adjusting function is valid, the process proceeds to step 804 to adjust the schedule, and if the transmission order adjusting function is invalid, the process proceeds to step 809 to end the schedule adjustment.

In step 804, the order replacement terminal extracting function 302 selects a plurality (at least two or more) of sensor devices 102 capable of replacing the order from the initial order, and the process proceeds to step 805. The selection of the replacement candidate sensor device 102 can adopt an arbitrary order such as a random order, a network subscription order, or the like.

Further, the wireless information 213 may be taken into consideration when extracting the sensor device 102 for which the order replacement terminal extracting function 302 replaces the order. For example, by replacing the transmission order of the data acquisition request so that the sensor device 102 having a large number of hops and the sensor device 102 having a small number of hops are alternately arranged, the actual number of times of wireless communication required for one data acquisition request (number of hops) can be leveled in terms of time.

In step 805, the retransmission time reallocation function 303 replaces the data acquisition order, and in step 806, the retransmission time reallocation function 303 changes the transmission schedule of the data acquisition request. At this time, the order including the first data acquisition request and the retransmission in the case in which the request fails is replaced, and the process proceeds to step 807. However, in the selected replacement candidate, it is determined whether the retransmission allocation propriety determining unit 304 satisfies conditions such as the retransmission interval and the number of retransmissions of the schedule information managing table 205 set by the system manger, the system management program, the service application 141, and the like in advance, and if the conditions are not satisfied, the replacement is not performed and the process proceeds to step 807.

In step 807, the communication traffic evaluating function 305 calculates the evaluation result in order to evaluate the result of the replacement of the data acquisition request order, and the process proceeds to step 808. For example, the number of request transmissions is calculated at intervals of a predetermined time (for example, 5 minutes), and the degree of variation in the number of request transmissions among the five minutes, the degree of variation in the number of request transmissions every 5 minutes, and the like are used as evaluation indices.

In step 808, the communication traffic evaluating function 305 determines whether or not the calculated evaluation index has reached a predetermined threshold value. If the evaluation index exceeds the threshold value, the process proceeds to step 809 and ends the schedule adjustment processing. If the evaluation index is smaller than the threshold value, the process returns to step 804 and repeatedly executes the replacement processes of steps 804 to 808. The threshold value is a predetermined system parameter in the system, and is determined in advance by the system manager, the system management program, the service application 141, and the like.

In the data collection apparatus 101, when a periodic data acquisition request is issued from the schedule managing unit 202, or when an on-demand data acquisition request is issued from the service application 141, the system manager, or the like, the data acquisition request transmission amount adjusting unit 206 stores the data acquisition request in the periodic transmission queue 207 or the on-demand transmission queue 208. The data acquisition request transmission amount adjusting unit 206 executes the transmission amount adjustment processing 901 of FIG. 9 and adjusts the timing of storing the data acquisition request based on the device information 204 and the wireless information 213.

First, when the transmission amount adjustment processing 901 starts, the schedule of period data acquisition just before and immediately after receiving the data acquisition request in step 902 is confirmed. In the present processing, the communication delay of the sensor device 102 receiving the data acquisition request is acquired from the wireless information managing table 213, and with respect to the number of periodic data acquisition requests scheduled to be transmitted until the communication delay time elapses after receiving this processing, and the transmitted data acquisition request, the number of response packets received until the communication delay time elapses is calculated, and the process proceeds to step 903. By calculating the number of the response packets received until the communication delay time elapses with respect to the transmitted data acquisition request, the data acquisition can be scheduled by considering both uplink and downlink traffics.

In step 903, it is determined whether or not a communication traffic load of the number of packets calculated in step 902 exceeds the threshold value. The communication traffic in step 903 may also take into consideration a response packet corresponding to the on-demand data acquisition request received immediately before. For example, a value obtained by adding the number of un-received response packets to the on-demand data acquisition request to the number of the periodic data acquisition requests is set as a communication traffic load. If the communication traffic load is the threshold value or more, the process proceeds to step 904, and if the communication traffic load is smaller than the threshold value, the process proceeds to step 905.

In step 904, if a start of the current transmission amount adjusting function is caused by the on-demand data acquisition request, the on-demand data acquisition request is changed to a reception waiting state so as not to further increase the communication load. More specifically, the on-demand data acquisition request is not stored in the on-demand transmission queue 208 but is held in the data acquisition request transmission amount adjusting unit 206. At this time, notification of a status of the on-demand data acquisition request may be provided to the service application 141 or the system manager, which is a request source of the on-demand data acquisition request. The status of the data acquisition request may include a transmission waiting, a transmission completion, and a reception completion. In addition, the process proceeds to step 902. Thus, even if an on-demand data acquisition request is made, an excessive increase in communication traffic can be avoided.

In step 905, when the start of the current transmission amount adjusting function is caused by the on-demand data acquisition request, the corresponding request is received and the process proceeds to step 906.

In step 906, the received on-demand data acquisition request is stored in the on-demand transmission queue 208. At this time, when the periodic data acquisition request is being transmitted, after waiting for at least the communication delay time acquired from the wireless information managing table 213, the received on-demand data acquisition request is stored in the on-demand transmission queue 208. When the periodic data acquisition request is not being transmitted, the received on-demand data acquisition request is immediately stored in the on-demand transmission queue 208 and the process proceeds to step 907. As described above, by scheduling an on-demand data acquisition request after waiting at least the communication delay time, it is possible to avoid collision with the response packet for the periodic data acquisition request.

Further, the transmission amount of the data acquisition request is controlled by the timing of storing the data acquisition request in the on-demand transmission queue 208, but the transmission amount of the data acquisition request may be controlled by the timing of taking out the data acquisition request from the on-demand transmission queue 208.

In step 907, the data length received from the sensor device 102 as the transmission destination of the on-demand data acquisition request is acquired from the device information managing table 204, the number of response packets to the on-demand acquisition request is calculated, and the process proceeds to step 908. For example, when a payload length of the wireless packet is 100 bytes and the data length transmitted by the sensor device 102 is 2 Kbytes, at least 20 response packets are received.

In step 908, it is determined whether or not the transmission interval adjustment for a regular schedule is necessary. In step 907, if there are many response packets to the on-demand data acquisition request, the process proceeds to step 909 and adjusts the transmission timing of the periodic data acquisition request. On the other hand, when there are not many response packets to the on-demand data acquisition request, it is not necessary to adjust the transmission timing of the periodic data acquisition request, and the processing thus proceeds to step 910 and ends the transmission amount adjustment processing.

In step 909, the interval for taking out the data acquisition request already stored in the periodic transmission queue 207 is adjusted. Since the communication traffic increases as the number of response packets of the data acquisition request increases, the interval of the periodic data acquisition request transmitted from the data collection apparatus 101 is extended, and the process proceeds to step 910. By the present processing, the communication traffic load on the wireless network can be suppressed.

As described above, in the data collection system according to the first embodiment, regarding the periodic data acquisition schedule set by the service application 141 or the system manager, the data collection apparatus 101 can level the data acquisition request generated from the data collection apparatus 101 in a long-term view by replacing the orders of the first data acquisition request and the data acquisition request for retransmission transmitted to all the sensor devices 102, and can level the communication traffic load. In addition, by adjusting the number of the on-demand data acquisition requests and the transmission interval in consideration of the communication traffic, a sudden increase in the communication traffic can be suppressed. Thus, the wireless multihop network can be stably operated.

Second Embodiment

In the first embodiment of the present invention described above, the use of data by the service application 141 was not taken into consideration in the order replacement processing of the periodic transmission. For example, there is a use in which a certain service application 141 acquires the data from a plurality of sensor devices 102 at the same timing (specifically, continuously) and uses the data acquired at the same timing together to determine the operation state of the measurement target. In this case, even after leveling the communication traffic, the data acquisition requests of the plurality of sensor devices 102 should be performed in a time-sequential manner. Therefore, if the order of the data acquisition request is replaced, inconvenience may occur in which a specific service application 141 cannot acquire accurate data. For this reason, in the second embodiment, a data collection system that determines the order of data acquisition request in consideration of a data acquisition order of a group of the related sensor devices will be described.

Figure 10:
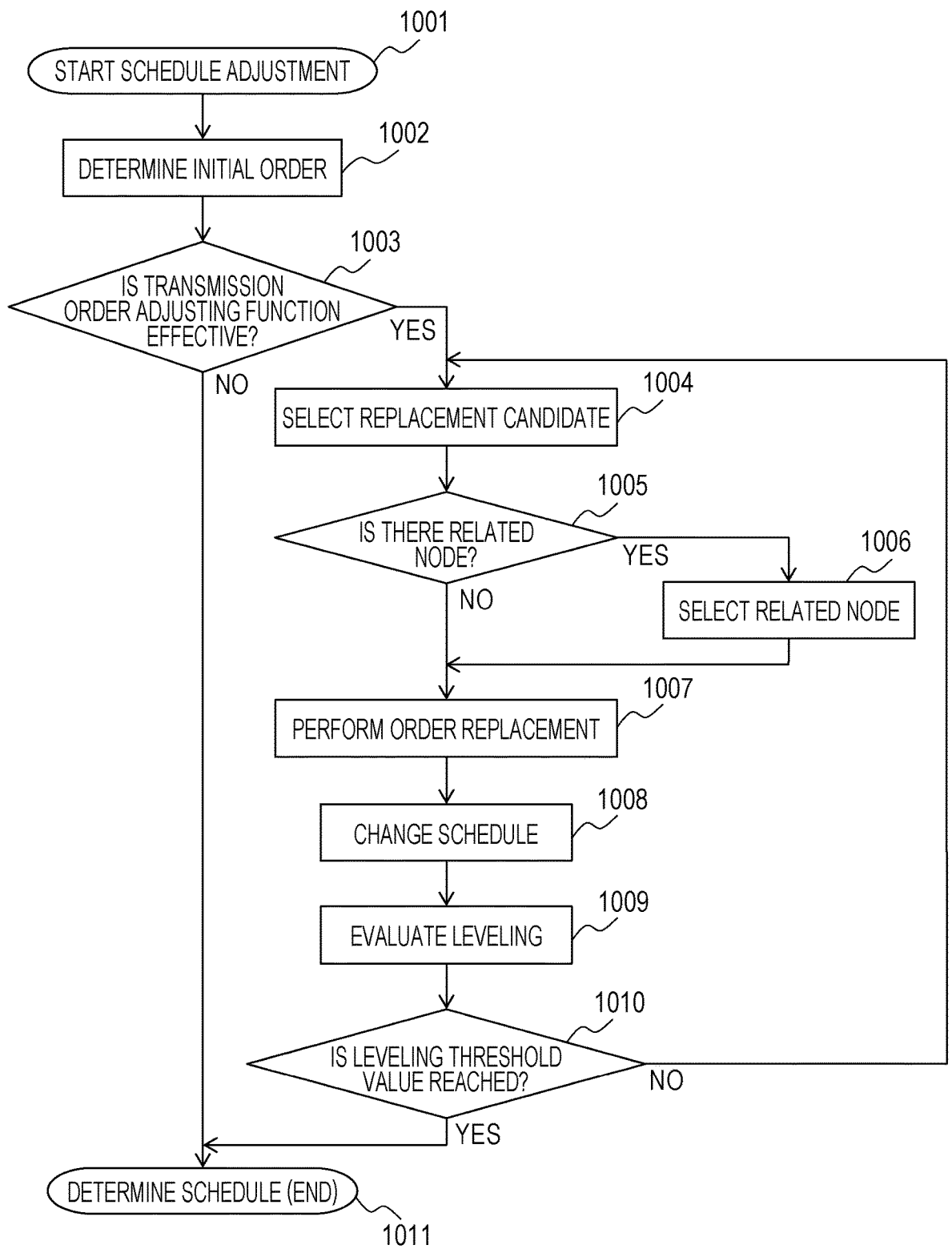
FIG. 10 is a flowchart of a schedule adjustment process according to a second embodiment.

Since the system configuration of the second embodiment, the configuration of the data collection apparatus 101, the function block of the schedule managing unit 202, the information setting screen 201, the various information managing tables 204, 205, 211, and 213, and the transmission amount adjustment processing 901 are the same as those of the first embodiment, the description thereof will be omitted and a schedule adjustment processing different from that of the first embodiment will be described with reference to FIG. 10

FIG. 10 is a flowchart of a schedule adjustment processing 1001 in consideration of data acquisition orders from the plurality of related sensor devices 102.

In the data collection apparatus 101, when the schedule for data acquisition request is input to the information setting screen 201 and the collection start button 401 is operated, the request transmission order determining unit 203 of the schedule managing unit 202 executes the processing illustrated in FIG. 10 for the data acquisition request transmitted to each sensor device 102 and determines the schedule of the data acquisition request.

First, in step 1002, the request transmission order determining unit 203 (initial order determining unit 301) reads out all the data stored in the schedule information managing table 205, and determines the order of the sensor devices 102 as transmission destinations of the data acquisition request, based on the start point time, the collection interval, the retransmission number, the retransmission interval, and the related Gr. The initial order determined in step 1002 can employ any order such as the order in which the wireless network is subscribed or a randomly arranged order, and the communication traffic may not necessarily be made uniform or leveled in the entire schedule. Further, as described in the first embodiment, the initial order may be arranged in the order of considering the wireless information 213 (for example, the sensor device 102 having a large number of hops and the sensor device 102 having a small number of hops may be alternately arranged). In the second embodiment, priority is given to a case in which the sensor devices 102 belonging to the same related Gr are continuously arranged.

Next, in step 1003, it is determined whether the transmission order adjusting function is valid or invalid. Specifically, it is possible to determine whether the transmission order adjusting function is switched to valid by the operation of the schedule adjusting function button 404 of the information setting screen 201. If the transmission order adjusting function is valid, the process proceeds to step 1004 to adjust the schedule, and if the transmission order adjusting function is not valid, the process proceeds to step 1011 to end the schedule adjustment.

In step 1004, the order replacement terminal extracting function 302 selects a plurality (at least two or more) of sensor devices 102 capable of replacing the order from the initial order, and the process proceeds to step 1005. The selection of the replacement candidate sensor device 102 can adopt an arbitrary method such as a random order, a network subscription order, or the like. Further, as described in the first embodiment, the sensor device 102 that replaces the order in consideration of the wireless information 213 may be extracted.

In step 1005, it is confirmed whether or not the sensor device 102 belonging to the same related Gr as the replacement candidate sensor device 102 extracted in step 1004 is present. If the sensor device 102 belonging to the same related Gr is present, the process proceeds to step 1006, and if the sensor device 102 belonging to the same related Gr is not present, the process proceeds to step 1007.

In step 1006, all the sensor devices 102 belonging to the same related Gr are selected so that the data acquisition requests to the plurality of sensor devices 102 belonging to the same related Gr are continuously scheduled, and the process proceeds to step 1007.

In step 1007, the retransmission time reallocation function 303 replaces the data acquisition order, and in step 1008, the retransmission time reallocation function 303 changes the transmission schedule of the data acquisition request. At this time, the order including the first data acquisition request and the retransmission in the case in which the request fails is replaced, and the process proceeds to step 1009. However, in the selected replacement candidate, it is determined whether the retransmission allocation propriety determining unit 304 satisfies conditions such as the retransmission interval and the number of retransmissions of the schedule information managing table 205 set by the system manger, the system management program, the service application 141, and the like in advance, and if the conditions are not satisfied, the replacement is not performed and the process proceeds to step 1009.

In step 1009, the communication traffic evaluating function 305 calculates the evaluation result in order to evaluate the result of the replacement of the data acquisition request order, and the process proceeds to step 1010. For example, the number of request transmissions is calculated at intervals of a predetermined time (for example, 5 minutes), and the degree of variation in the number of request transmissions among the five minutes, the degree of variation in the number of request transmissions every 5 minutes, and the like are used as evaluation indices.

In step 1010, the communication traffic evaluating function 305 determines whether or not the calculated evaluation index has reached a predetermined threshold value. If the evaluation index exceeds the threshold value, the process proceeds to step 1011 and ends the schedule adjustment processing. If the evaluation index is smaller than the threshold value, the process returns to step 1004 and repeatedly executes the replacement processes of steps 1004 to 1010. The threshold value is a predetermined system parameter in the system, and is determined in advance by the system manager, the system management program, the service application 141, and the like.

As described above, in the data collection system according to the present embodiment, in addition to the effects of the above-described embodiment, even if the periodic data acquisition schedule set by the service application 141 or the system manager is changed, since the data that the service application 141 wants to use together can be continuously acquired from the sensor devices 102, the data can be provided in consideration of simultaneity required by the service application 141.

In the embodiment described above, the related sensor device 102 is specified by the information of the related Gr input to the information setting screen 201, but if relevance between the sensor devices 102 can be specified, the relevance can be specified in other aspects.

Third Embodiment

In the first and second embodiments described above, the data amount (the number of packets) of the response packet caused by each data acquisition request is not taken into consideration in the periodic transmission order replacement processing. Therefore, there are cases in which the communication traffic increases in the vicinity of the response packet with a large data amount and the communication traffic decreases in the vicinity of the response packet with a small data amount. In order to level the communication traffic of the wireless network, the order of data acquisition requests should be replaced in consideration of the number of response packets. For this reason, in the third embodiment, a data collection system that determines the order of data acquisition request in consideration of a data amount of the response packet will be described. In addition, as in the second embodiment, an example of considering the relevance between the sensor devices will be described, but the third embodiment may be combined with the first embodiment alone without combining with the second embodiment.

Figure 11:
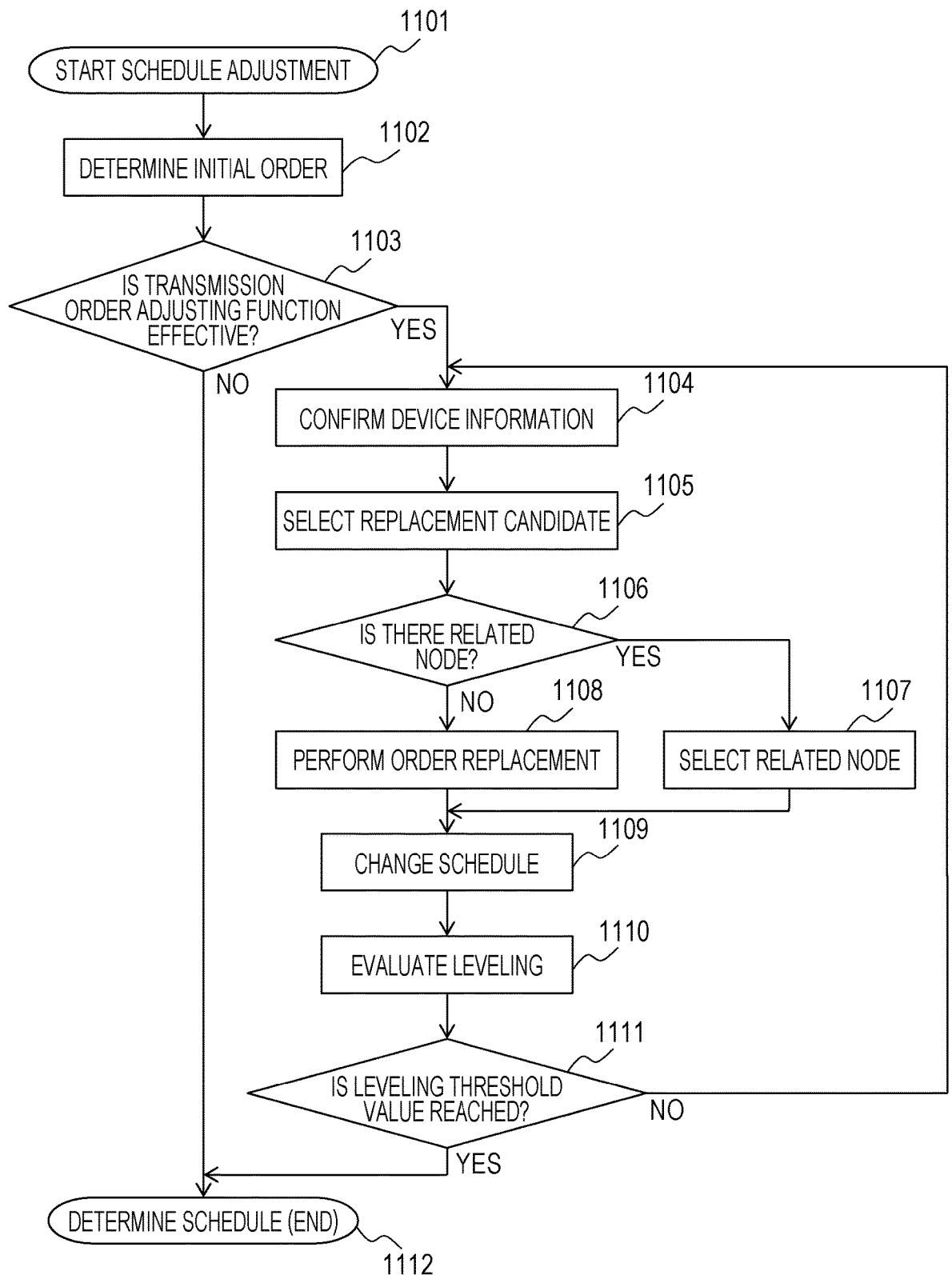
FIG. 11 is a flowchart of a schedule adjustment process according to a third embodiment.

Since the system configuration of the third embodiment, the configuration of the data collection apparatus 101, the function block of the schedule managing unit 202, the information setting screen 201, the various information managing tables 204, 205, 211, and 213, the transmission amount adjustment processing 901 are the same as those of the first and second embodiments, the description thereof will be omitted and a schedule adjustment processing different from that of the first and second embodiments will be described with reference to FIG. 11

FIG. 11 is a flowchart of a schedule adjustment processing 1001 in consideration of the data amount of the response packet.

In the data collection apparatus 101, when the schedule for data acquisition request is input to the information setting screen 201 and the collection start button 401 is operated, the request transmission order determining unit 203 of the schedule managing unit 202 executes the processing illustrated in FIG. 11 for the data acquisition request transmitted to each sensor device 102 and determines the schedule of the data acquisition request.

First, in step 1102, the request transmission order determining unit 203 (initial order determining unit 301) reads out all the data stored in the schedule information managing table 205, and determines the order of the sensor devices 102 as transmission destinations of the data acquisition request, based on the start point time, the collection interval, the retransmission number, the retransmission interval, and the related Gr. The initial order determined in step 1102 can employ any order such as the order in which the wireless network is subscribed or a randomly arranged order, and the communication traffic may not necessarily be made uniform or leveled in the entire schedule. Further, as described in the first embodiment, the initial order may be arranged in the order of considering the wireless information 213 (for example, the sensor device 102 having a large number of hops and the sensor device 102 having a small number of hops may be alternately arranged). Also in the third embodiment, priority is given to a case in which the sensor devices 102 belonging to the same related Gr are continuously arranged.

Next, in step 1103, it is determined whether the transmission order adjusting function is valid or invalid. Specifically, it is possible to determine whether the transmission order adjusting function is switched to valid by the operation of the schedule adjustment function button 404 of the information setting screen 201. If the transmission order adjusting function is valid, the process proceeds to step 1104 to adjust the schedule, and if the transmission order adjusting function is not valid, the process proceeds to step 1112 to end the schedule adjustment.

In step 1104, the data length of the response packet for the data acquisition request is acquired from the device information 204 managed by the schedule managing unit 202, the number of response packets is calculated, and the process proceeds to step 1105.

In step 1105, the order replacement terminal extracting function 302 selects a plurality (at least two or more) of sensor devices 102 capable of replacing the order from the initial order, and the process proceeds to step 1106. The selection of the replacement candidate sensor device 102 can adopt an arbitrary method such as a random order, a network subscription order, or the like. Further, as described in the first embodiment, the sensor device 102 that replaces the order in consideration of the wireless information 213 may be extracted.

In step 1106, it is confirmed whether or not the sensor device 102 belonging to the same related Gr as the replacement candidate sensor device 102 extracted in step 1105 is present. If the sensor device 102 belonging to the same related Gr is present, the process proceeds to step 1107, and if the sensor device 102 belonging to the same related Gr is not present, the process proceeds to step 1108.

In step 1107, all the sensor devices 102 belonging to the same related Gr are selected so that the data acquisition requests to the plurality of sensor devices 102 belonging to the same related Gr are continuously scheduled, and the process proceeds to step 1109.

In step 1108, the retransmission time reallocation function 303 replaces the data acquisition order. At this time, the order including the first data acquisition request and the retransmission in the case in which the request fails is replaced, and the process proceeds to step 1109. However, the data acquisition order is replaced so that the data acquisition requests to the sensor devices 102 belonging to the same related Gr selected in step 1107 are continuously scheduled. In addition, even when the data acquisition requests are continuously scheduled, the data acquisition order may be replaced so that a variation in the total number of the number of data acquisition requests and the number of response packets becomes smaller by considering the number of response packets calculated in step 1104 among the sensor devices 102 related to successive data acquisition requests.

In addition, as in the first and second embodiments, in the selected replacement candidate, it is determined whether the retransmission allocation propriety determining unit 304 satisfies conditions such as the retransmission interval and the number of retransmissions of the schedule information managing table 205 set by the system manger, the system management program, the service application 141, and the like in advance, and if the conditions are not satisfied, the replacement is not performed and the process proceeds to step 1109.

In step 1109, the retransmission time reallocation function 303 replaces the transmission schedule of the data acquisition request.

In step 1110, the communication traffic evaluating function 305 calculates the evaluation result in order to evaluate the result of the replacement of the data acquisition request order, and the process proceeds to step 1111. For example, the number of request transmissions is calculated at intervals of a predetermined time (for example, 5 minutes), and the degree of variation in the number of request transmissions among the five minutes, the degree of variation in the number of request transmissions every 5 minutes, and the like are used as evaluation indices.

In step 1111, the communication traffic evaluating function 305 determines whether or not the calculated evaluation index has reached a predetermined threshold value. If the evaluation index exceeds the threshold value, the process proceeds to step 1112 and ends the schedule adjustment processing. If the evaluation index is smaller than the threshold value, the process returns to step 1104 and repeatedly executes the replacement processes of steps 1104 to 1111. The threshold value is a predetermined system parameter in the system, and is determined in advance by the system manager, the system management program, the service application 141, and the like.

As described above, since the data collection system according to the third embodiment sets the schedule of the data acquisition request in consideration of the data amount acquired from the sensor device 102, in addition to the effects of the above-described embodiments, even in the case of collecting large amount of data, the communication traffic can be leveled and the wireless multihop network can be operated stably. For example, it is effective for collecting system logs once a month, collecting images taken of the measurement targets, or the like As described above, according to the embodiment of the present invention, the data collection apparatus includes the schedule managing unit 202 that determines the schedule for transmitting the data acquisition request to the sensor device 102 according to the timing data, the data acquisition request transmission amount adjusting unit 206 that adjusts the transmission amount of the data acquisition request, and the collected data managing unit 210 that manages the data collected from the sensor device 102, and since the schedule managing unit 202 manages the start point time 502 at which the data collection from the sensor device 102 is started, the collection period 503 that is an interval of data collection from the sensor device 102, the retransmission interval 504 that is a time until the data acquisition request is retransmitted when the data collection from the sensor device 102 fails, and the retransmission number 505 that is the number of times to retransmit the data acquisition request as the timing data, the schedule for collecting the data from the sensor device 102 can be created flexibly.

In addition, the schedule managing unit 202 holds a plurality of combinations of the start point time 502, the collection period 503, the retransmission interval 504, and the retransmission number 505 for one sensor device 102, and in accordance with the plurality of held combinations, the schedule managing unit 202 determines the transmission schedule of the data acquisition request to the sensor device 102, the sensor device 102 can be utilized by a plurality of uses (service application 141). In addition, the data can be acquired at uneven periods (for example, 9 o'clock and 17 o'clock every day) of the day.

In addition, the data acquisition request transmission amount adjusting unit 206 delays the transmission of the on-demand data acquisition request that is transmitted irregularly, based on the comparison result between the communication load based on the periodically transmitted data acquisition request and the predetermined threshold value, the data acquisition request transmission amount adjusting unit 206 can adjust the communication schedule in consideration of on-demand communication, stably operate the wireless multihop network, and improve a data collection rate.

In addition, since the schedule managing unit 202 manages the plurality of sensor devices 102 as one group and determines the transmission schedule of the data acquisition request so that the data acquisition request is continuously transmitted to the plurality of sensor devices 102 belonging to the same group in order to continuously collect data from the plurality of sensor devices 102 belonging to the same group, the schedule managing unit 202 can acquire the data from the plurality of sensor devices 102 at the same timing and correspond to the service application 141 requiring the data at the same timing.

In addition, since the schedule managing unit 202 determines the transmission schedule of the data acquisition request so that the traffic on the communication path 103 is leveled in consideration of the data amount of the response packet in response to the data acquisition request, the schedule managing unit 202 can collect large amount of data without affecting data collections from other sensor devices 102.

In addition, since the data acquisition request transmission amount adjusting unit 206 determines the timing to transmit the data acquisition request at a time interval longer than or equal to the delay time from the transmission of the data acquisition request to the reception of the response packet, the data acquisition request transmission amount adjusting unit 206 can suppress a collision between the response packet and the data acquisition request and improve the data collection rate.

In addition, since the schedule managing unit 202 selects two terminal devices 102 as the reception destinations of the data acquisition request, determines whether the condition of the data acquisition defined for each terminal device 102 is satisfied if the orders of the data acquisition requests of the selected terminal devices 102 are replaced, does not replace the orders of the data acquisition requests of the terminal devices 102 and selects two terminal devices 102 different from at least one of the selected terminal devices 102 if the condition of data acquisition is not satisfied, changes the transmission schedule of the data acquisition requests by replacing the orders of the data acquisition requests of the terminal devices 102, and evaluates whether the traffic of the communication path 103 is leveled in the transmission schedule after the change if the condition of data acquisition is satisfied, and further selects two terminal devices 102 different from at least one of the selected terminal devices 102 and replaces the orders of the data acquisition request if the traffic of the communication path 103 does not satisfy the condition of a predetermined leveling, the communication load can be leveled under preset conditions. In addition, by determining whether the condition of the data acquisition is satisfied, a load of the process of replacing the order of the data acquisition request can be reduced and the speed can be increased.

It should be noted that the present invention is not limited to the above-described embodiments, but includes various modifications and equivalent structures within the scope of the appended claims. For example, the above-described embodiments are described in detail to facilitate understanding of the present invention, and the present invention is not limited to those having all the configurations described. In addition, a part of the configuration of an embodiment may be replaced by a configuration of another embodiment. In addition, the configuration of another embodiment may be added to the configuration of one embodiment. In addition, other configurations may be added, deleted, or replaced with respect to a part of the configuration of each embodiment.

In addition, the above-described configurations, functions, processing units, processing means, and the like may be realized by hardware, for example, by designing some or all of them with an integrated circuit or the like, and may be implemented by software by the processor interpreting and executing the program implementing the respective functions.

Information such as programs, tables, files, and the like that implement each function can be stored in a storage device such as a memory, a hard disk, a solid state drive (SSD), or a recording medium such as an IC card, an SD card, a DVD, or the like.

In addition, a control line or an information line indicates what is considered to be necessary for the explanation, and does not indicate all control lines and information lines necessary for mounting. In fact, it may be thought that almost all configurations are interconnected.

What is claimed is:

1. A data collection apparatus collecting data from a terminal device connected through a communication path, the data collection apparatus comprising:
   a schedule managing unit determining a schedule transmitting a data acquisition request to the terminal device according to timing data;
   a transmission amount adjusting unit adjusting a transmission amount of the data acquisition request; and
   a collected data managing unit managing the data collected from the terminal device;
   a device information managing table managing information unique to the terminal device, comprising a device ID, a device type, and a data length,
   wherein the schedule managing unit manages, based on the timing data and the information in the device information managing table, a start point time that is a time at which a data collection from the terminal device starts, a collection period that is an interval of the data collection from the terminal device, a retransmission interval that is a time until the data acquisition request is retransmitted when the data collection from the terminal device fails, and a retransmission number that is the number of times to retransmit the data acquisition request according to the timing data and the information stored in the device information managing table;
   wherein the schedule managing unit
      selects two terminal devices as reception destinations of the data acquisition request,
      changes a transmission schedule of the data acquisition request by replacing orders of the data acquisition requests of the selected terminal devices,
   evaluates whether a traffic of the communication path is leveled in the transmission schedule after the change, and
   further selects two terminal devices different from at least one of the selected terminal devices to replace the orders of the data acquisition requests when the traffic of the communication path does not satisfy a predetermined leveling condition;
   wherein when the orders of the data acquisition requests of the selected terminal devices are replaced, the schedule managing unit does not replace the orders of the data acquisition requests of the terminal devices when a condition of a data acquisition defined for each terminal device is not satisfied, and further selects two terminal devices different from at least one of the selected terminal devices to replace the orders of the data acquisition requests.

2. The data collection apparatus according to claim 1, wherein the schedule managing unit
holds a plurality of combinations of the start point time, the collection period, the retransmission interval, and the retransmission number for one terminal device, and
determines a transmission schedule of the data acquisition request to the terminal device according to the plurality of held combinations.

3. The data collection apparatus according to claim 1, wherein the transmission amount adjusting unit delays a transmission of the data acquisition request that is transmitted irregularly, based on a comparison result between a communication load according to a periodically transmitted data acquisition request and a predetermined threshold.

4. The data collection apparatus according to claim 1, wherein the schedule managing unit manages a plurality of the terminal devices as one group, and determines a transmission schedule of the data acquisition request so as to continuously transmit the data acquisition request to the plurality of terminal devices belonging to the same group in order to continuously collect the data from the plurality of terminal devices belonging to the same group.

5. The data collection apparatus according to claim 1, wherein the schedule managing unit determines a transmission schedule of the data acquisition request so that a traffic of the communication path is leveled, in consideration of a data amount of a response packet for the data acquisition request.

6. The data collection apparatus according to claim 1, wherein the transmission amount adjusting unit determines a timing to transmit the data acquisition request at a time interval greater than or equal to a delay time from the transmission of the data acquisition request to a reception of a response packet.

7. A method for collecting, by a data collection apparatus, data from a terminal device connected through a communication path,
the data collection apparatus having an arithmetic device executing a predetermined process, a storage device connected to the arithmetic device, and a communication interface connected to the arithmetic device, the method comprising:

a schedule managing process of managing, by the arithmetic device, timing data referenced to determine a schedule at which a data acquisition request is transmitted to the terminal device;

a device information process of managing, by the arithmetic device, a device information table of information unique to the terminal device, comprising a device ID, a device type, and a data length, a schedule determining process of determining, by the arithmetic device, a schedule at which the data acquisition request is transmitted to the terminal device according to the managed timing data and the device information table;

a transmission amount adjusting process of adjusting, by the arithmetic device, a transmission amount of the data acquisition request; and a data collecting process of managing, by the arithmetic device, the data collected from the terminal device, wherein in the schedule managing process, the arithmetic device manages a start point time that is a time at which a data collection from the terminal device starts, a collection period that is an interval of the data collection from the terminal device, a retransmission interval that is a time until the data acquisition request is retransmitted when the data collection from the terminal device fails, and a retransmission number that is the number of times to retransmit the data acquisition request according to the timing data wherein the schedule managing process further comprises selecting two terminal devices as reception destinations of the data acquisition request, changing a transmission schedule of the data acquisition request by replacing orders of the data acquisition requests of the selected terminal devices, evaluating whether a traffic of the communication path is leveled in the transmission schedule after the change, and further selecting two terminal devices different from at least one of the selected terminal devices to replace the orders of the data acquisition requests when the traffic of the communication path does not satisfy a predetermined leveling condition;

wherein when the orders of the data acquisition requests of the selected terminal devices are replaced, the schedule managing process does not replace the orders of the data acquisition requests of the terminal devices when a condition of a data acquisition defined for each terminal device is not satisfied, and further selects two terminal devices different from at least one of the selected terminal devices to replace the orders of the data acquisition requests.

8. The data collection method according to claim 7, wherein in the schedule managing process, the arithmetic device manages a plurality of combinations of the start point time, the collection period, the retransmission interval, and the retransmission number for one terminal device, and in the schedule determining process, the arithmetic device determines the transmission schedule of the data acquisition request to the terminal device according to the plurality of managed combinations.

9. The data collection method according to claim 7, wherein in the transmission amount adjusting process, the arithmetic device delays a transmission of the data acquisition request that is transmitted irregularly, based on a comparison result between a communication load according to a periodically transmitted data acquisition request and a predetermined threshold value.

10. The data collection method according to claim 7, wherein in the schedule managing process, the arithmetic device manages a plurality of the terminal devices as one group, and in the schedule determining process, the arithmetic device determines a transmission schedule of the data acquisition request so as to continuously transmit the data acquisition request to the plurality of terminal devices belonging to the same group in order to continuously collect the data from the plurality of terminal devices belonging to the same group.

11. The data collection method according to claim 7, wherein in the schedule determining process, the arithmetic device determines a transmission schedule of the data acquisition request so that a traffic of the communication path is leveled, in consideration of a data amount of a response packet for the data acquisition request.

12. The data collection method according to claim 7, wherein in the transmission amount adjusting process, the arithmetic device determines a timing to transmit the data acquisition request at a time interval greater than or equal to a delay time from the transmission of the data acquisition request to a reception of a response packet.

13. The data collection method according to claim 7, wherein in the schedule determining process, the arithmetic device selects two terminal devices as reception destinations of the data acquisition request, the arithmetic device determines whether a condition of a data acquisition defined for each terminal device is satisfied when orders of the data acquisition requests of the selected terminal devices are replaced, when the condition of the data acquisition is not satisfied, the arithmetic device does not replace the orders of the data acquisition requests of the terminal devices and further selects two terminal devices different from at least one of the selected terminal devices, when the condition of the data acquisition is satisfied, the arithmetic device changes a transmission schedule of the data acquisition request by replacing the orders of the data acquisition requests of the terminal devices, the arithmetic device evaluates whether a traffic of the communication path is leveled in the transmission schedule after the change, and when the traffic of the communication path does not satisfy a predetermined leveling condition, the arithmetic device further selects two terminal devices different from at least one of the selected terminal devices and replaces the orders of the data acquisition requests.

\* \* \* \* \*